(12) United States Patent
Takahashi (10) Patent No.: US 9,678,455 B2
(45) Date of Patent: Jun. 13, 2017

(54) OPTICAL SCANNING DEVICE AND IMAGE FORMING APPARATUS INCLUDING THE SAME

(71) Applicant: KYOCERA Document Solutions Inc., Osaka (JP)

(72) Inventor: Hiroki Takahashi, Osaka (JP)

(73) Assignee: KYOCERA DOCUMENT SOLUTIONS INC., Osaka (JP)

(*) Notice: Subject to any disclaimer, the term of this patent is extended or adjusted under 35 U.S.C. 154(b) by 0 days.

(21) Appl. No.: 15/118,223

(22) PCT Filed: May 11, 2015

(86) PCT No.: PCT/JP2015/063444
§ 371 (c)(1),
(2) Date: Aug. 11, 2016

(87) PCT Pub. No.: WO2015/194284
PCT Pub. Date: Dec. 23, 2015

(65) Prior Publication Data
US 2017/0139345 A1  May 18, 2017

(30) Foreign Application Priority Data

Jun. 20, 2014  (JP) .................................. 2014-127094

(51) Int. Cl.
*G03G 15/00* (2006.01)
*G03G 15/04* (2006.01)
(Continued)

(52) U.S. Cl.
CPC ..... *G03G 15/04036* (2013.01); *G02B 26/105* (2013.01); *G02B 26/126* (2013.01); *H04N 1/113* (2013.01); *H04N 2201/0094* (2013.01)

(58) Field of Classification Search
CPC ............ G03G 15/04036; G02B 26/105; G02B 26/126; H04N 1/113; H04N 2201/0094
(Continued)

(56) References Cited

U.S. PATENT DOCUMENTS 5,751,464 A * 5/1998 Yoshikawa .......... G02B 26/126
                                                    359/204.1
6,426,825 B1 * 7/2002 Inagaki ................ G02B 26/126
                                                    359/207.1
(Continued)

FOREIGN PATENT DOCUMENTS

JP      10-78553      3/1998
JP      2000-180778   6/2000
(Continued)

OTHER PUBLICATIONS

International Search Report issued Jul. 14, 2015 in corresponding PCT/JP2015/063444.

*Primary Examiner* — Billy Lactaoen
(74) *Attorney, Agent, or Firm* — Wenderoth, Lind & Ponack, L.L.P.

(57) ABSTRACT

The optical scanning device includes a polygon mirror, one or more planar mirrors for reflecting the beam light so as to be led to a photosensitive drum, and a pressing member for pressing a back surface of a final planar mirror. The final planar mirror has a glass plate for allowing the beam light to pass therethrough and a reflection layer arranged on an opposite surface of the glass plate. The beam light passes through the glass plate and is reflected at the opposite surface side, so that a scanning line is curved on a surface to be scanned in a convex shape to one side in a sub-scanning direction. The final planar mirror is pressed by the pressing member so as to be curved, so that the scanning line on the surface to be scanned is adjustable to a flat shape.

6 Claims, 4 Drawing Sheets

(51) Int. Cl.
*G02B 26/10* (2006.01)
*G02B 26/12* (2006.01)
*H04N 1/113* (2006.01)

(58) Field of Classification Search
USPC ............................................... 399/118, 51, 4
See application file for complete search history.

(56) References Cited

U.S. PATENT DOCUMENTS

| | | | |
|---|---|---|---|
| 2009/0009840 A1* | 1/2009 | Shoji | G02B 26/126 359/205.1 |
| 2013/0176606 A1* | 7/2013 | Jin | G03G 15/0435 359/205.1 |
| 2014/0225974 A1* | 8/2014 | Park | G03G 15/04045 347/224 |

FOREIGN PATENT DOCUMENTS

| | | |
|---|---|---|
| JP | 2006-17881 | 1/2006 |
| JP | 2010-2881 | 1/2010 |

* cited by examiner

OPTICAL SCANNING DEVICE AND IMAGE FORMING APPARATUS INCLUDING THE SAME

TECHNICAL FIELD

The present invention relates to an optical scanning device that forms a latent image on a surface to be scanned by exposure scanning, and an image forming apparatus including the same, such as a copy machine, a printer, a facsimile, and a multifunctional peripheral thereof.

BACKGROUND ART

An optical scanning device used in a copy machine, a printer and the like generally includes a light source, a polygon mirror (a rotating polygon mirror) for deflecting and scanning beam light from the light source in a main scanning direction, a fθlens for forming an image of the beam light deflected by the polygon mirror on a surface to be scanned, and one or more planar mirrors provided on optical paths between the polygon mirror and the surface to be scanned.

Herein, when a manufacturing error, a mounting error and the like occur in the fθlens or the planar mirror, there is a case of causing a phenomenon (hereinafter, referred to as scanning line curvature) that beam light is curved in a sub-scanning direction.

Therefore, for example, Patent Literature 1 discloses an optical writing device (an optical scanning device) that curves a reflection mirror (a planar mirror) in order to suppress scanning line curvature. In this optical writing device, a scanning line curve adjusting means is provided to adjust the curved amount of the reflection mirror in a direction curved in a convex and concave shape with respect to the incidence direction of light beams. In this way, even though scanning lines are curved in a convex shape to one side in a sub-scanning direction and are curved in a convex shape to the other side in the sub-scanning direction, the reflection mirror is curved in a concave shape or a convex shape with respect to the incidence direction of the light beams, so that it is possible to reduce the curved amount of the scanning lines.

In addition, in a color image forming apparatus, when scanning line curvature occurs on surfaces to be scanned of photoreceptors corresponding to each color, since a color shift occurs in a color image to be formed due to a shift of scanning lines, the scanning line curvature is likely to be problematic in the color image forming apparatus.

CITATION LIST

Patent Literature

Patent Literature 1: Japanese Laid-open Patent Publication No. 2006-17881

SUMMARY OF INVENTION

Technical Problem

However, in the optical writing device disclosed in Patent Literature 1, since it is necessary to configure the scanning line curve adjusting means such that the reflection mirror can be curved in a concave shape or a convex shape with respect to the incidence direction of the light beams, the structure of the scanning line curve adjusting means is complicated, resulting in a problem that the number of parts increases and the cost increases.

Accordingly, an object of the present invention is to provide an optical scanning device capable of suppressing scanning line curvature with a simple configuration, and an image forming apparatus including the same.

Solution to Problem

In order to achieve the aforementioned object, an optical scanning device of the present invention includes a rotating polygon mirror that deflects and scans beam light from a light source in a main scanning direction, a lens that forms an image of the beam light deflected by the rotating polygon mirror on a surface to be scanned, one or more planar mirrors provided on an optical path between the rotating polygon mirror and the surface to be scanned and reflecting the beam light so as to be led to the surface to be scanned, and a pressing member that presses a back surface of the planar mirror. The planar mirror includes a first planar mirror and a second planar mirror. The first planar mirror includes a glass plate, which has a light incident surface into which the beam light is incident and an opposite surface arranged at an opposite side of the light incident surface and allows the beam light to pass therethrough, and a reflection layer arranged on the opposite surface of the glass plate. The second planar mirror has the back surface pressed by the pressing member. Furthermore, the beam light passes through the glass plate of the first planar mirror and is reflected at the opposite surface side, so that a scanning line is curved on the surface to be scanned in a convex shape to one side in a sub-scanning direction, and the back surface of the second planar mirror is pressed by the pressing member and the second planar mirror is curved, so that the scanning line on the surface to be scanned, which has been curved by the first planar mirror, is adjustable to a flat shape.

Advantageous Effects of Invention

According to the present invention, a beam light passes through a glass plate of a first planar mirror and is reflected at an opposite surface side, so that a scanning line is curved in a convex shape on a surface to be scanned to one side in a sub-scanning direction, and the back surface of a second planar mirror is pressed by a pressing member and the second planar mirror is curved, so that it is possible to adjust the scanning line on the surface to be scanned, which has been curved by the first planar mirror, to a flat shape. That is, the first planar mirror is formed such that the scanning line is curved in a convex shape to one side in the sub-scanning direction and the second planar mirror is curved by the pressing member, so that the scanning line has a flat shape. Therefore, since it is sufficient if the second planar mirror can be curved to only one side in a thickness direction, it is possible to suppress scanning line curvature by using the pressing member having a configuration of simply pressing the back surface of the second planar mirror.

Furthermore, the beam light passes through the glass plate of the first planar mirror and is reflected at the reflection surface side. In this case, since the incidence angles of the beam light are different from each other by the positions (the center portion, the end portions and the like) of the glass plate and thus the optical path lengths of the beam light passing through the glass plate are different from each other, scanning line curvature can easily occur.

Furthermore, the thickness of the glass plate is changed, so that it is possible to easily adjust the curved amount of a scanning line which is applied in advance to one side in the sub-scanning direction.

DESCRIPTION OF EMBODIMENTS

Hereinafter, an embodiment of the present invention will be described with reference to the drawings.

With reference to FIG. 1 to FIG. 7, an image forming apparatus 1 including an optical scanning device 20 according to an embodiment of the present invention will be described. The image forming apparatus 1 of the present embodiment is a tandem type color printer, and at a lower portion of the image forming apparatus 1, a paper feeding unit 2 such as a paper feeding cassette is provided to receive stacked paper bundles. The paper feeding unit 2 is provided at one end portion thereof with a separation feeding unit 3 for feeding stacked papers P from the uppermost paper one by one. Above the separation feeding unit 3, a paper conveyance path 5 is formed to extend upwardly to a discharge tray 4 formed on an upper surface of a body. Along the paper conveyance path 5, the separation feeding unit 3, a conveying roller pair 6, a resist roller pair 7, a transfer roller 8, a fixing roller 9, and a paper discharge roller pair 10 are arranged sequentially from an upstream in a paper conveyance direction.

Figure 1:
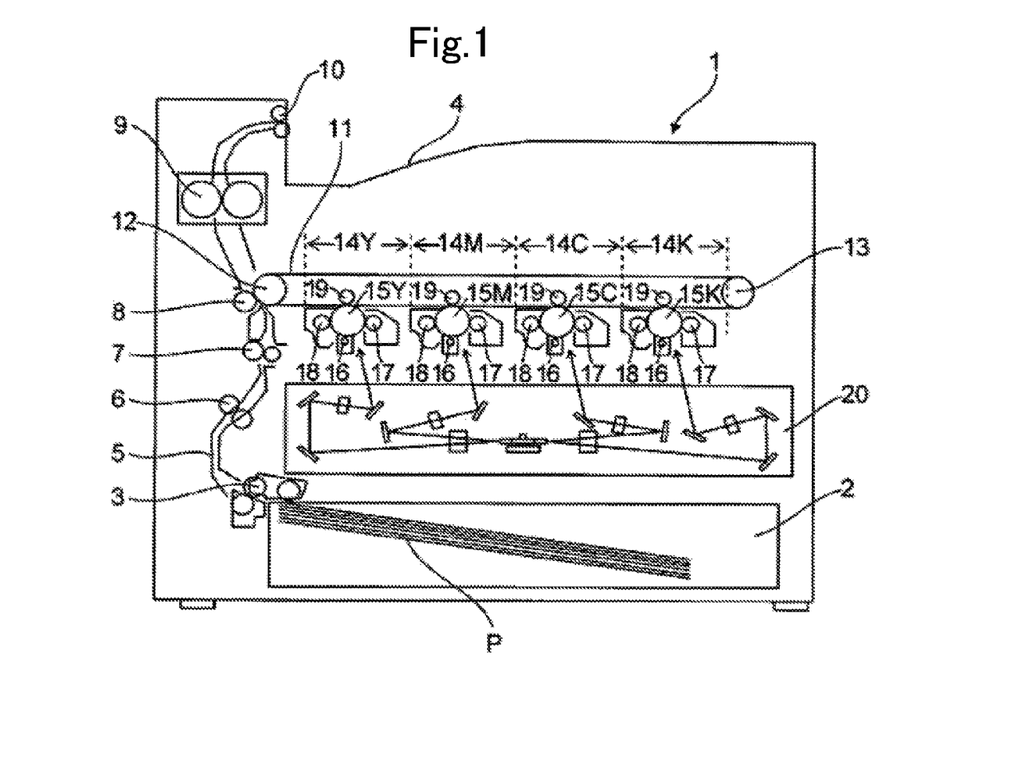
FIG. 1 is a sectional view schematically illustrating a structure of an image forming apparatus including an optical scanning device of an embodiment of the present invention.

At a right side of the transfer roller 8, an intermediate transfer belt 11 is arranged so as to be freely rotatable. The intermediate transfer belt 11 has been stretched over a driving roller 12 and a driven roller 13, wherein the driving roller 12 is rotationally driven, so that the intermediate transfer belt 11 is rotated clockwise. Furthermore, the driving roller 12 abuts the aforementioned transfer roller 8 via the intermediate transfer belt 11. In addition, as the intermediate transfer belt 11, a sheet made of a dielectric resin is used, and a jointless (seamless) belt is mainly used.

Below the intermediate transfer belt 11, along a rotation direction, four image forming units 14K, 14C, 14M, and 14Y are installed sequentially from the right side in FIG. 1. These image forming units 14K, 14C, 14M, and 14Y are provided corresponding to images of different four colors (black, cyan, magenta, and yellow), and sequentially form black, cyan, magenta, and yellow images by charging, exposure, developing, and transfer processes, respectively.

These image forming units 14K, 14C, 14M, and 14Y are provided with photosensitive drums (image carrying members) 15K, 15C, 15M, and 15Y for carrying visible images (toner images) of each color, and around each of the photosensitive drums 15K, 15C, 15M, and 15Y installed so as to be freely rotatable, a charging device 16 for charging the photosensitive drums 15K, 15C, 15M, and 15Y, a developing unit 17 for forming toner images on the photosensitive drums 15K, 15C, 15M, and 15Y, a cleaning unit 18 for removing developers remaining on the photosensitive drums 15K, 15C, 15M, and 15Y, and an intermediate transfer roller 19 abutting the photosensitive drums 15K, 15C, 15M, and 15Y via the intermediate transfer belt 11 are formed. Moreover, below the photosensitive drums 15K, 15C, 15M, and 15Y, the optical scanning device 20 is arranged to expose image information to the photosensitive drums 15K, 15C, 15M, and 15Y.

Figure 2:
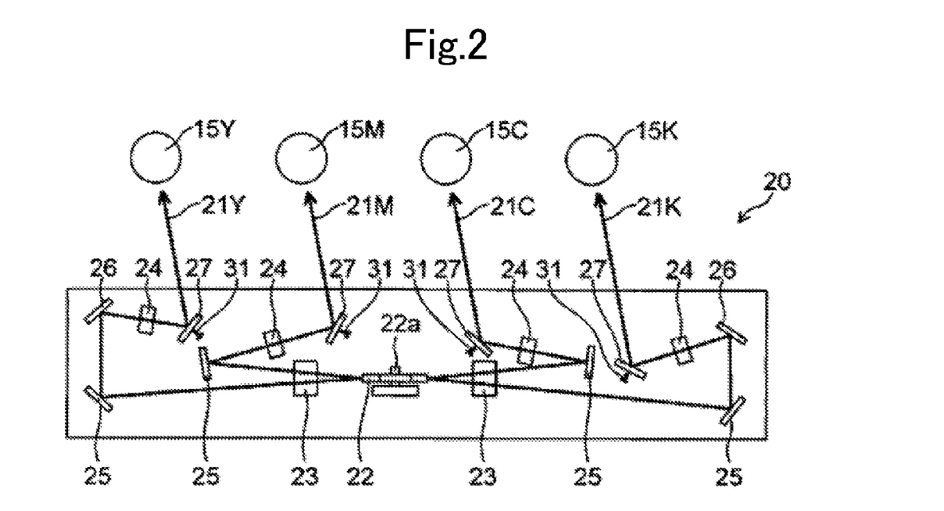
FIG. 2 is a sectional view illustrating a structure of an optical scanning device of an embodiment of the present invention and each photosensitive drum.

Hereinafter, with reference to FIG. 2, the optical scanning device 20 will be further described. The optical scanning device 20 includes a light source (not illustrated) for emitting beam light 21 modulated on the basis of an image signal, a polygon mirror 22 serving as a rotating polygon mirror, first fθlenses 23, and second fθlenses 24. Furthermore, on each optical path between the polygon mirror 22 and surfaces to be scanned of the photosensitive drums 15K, 15C, 15M, and 15Y, planar mirrors 25 for reflecting beam light having passed through the first fθlenses 23, planar mirrors 26 provided according to necessity, and final planar mirrors (a first planar mirror and a second planar mirror) 27 for reflecting the beam light toward the photosensitive drums 15K, 15C, 15M, and 15Y are arranged.

In the optical scanning device 20, four light sources (not illustrated) are provided to emit beam lights 21K, 21C, 21M, and 21Y modulated on the basis of image signals of black, cyan, magenta, and yellow, respectively. The polygon mirror 22 is rotated around a rotating shaft 22a by a polygon motor (not illustrated), thereby deflecting the beam lights 21K, 21C, 21M, and 21Y, which have been incident into reflection surfaces, at a constant angular velocity in a main scanning direction.

The first fθlenses 23 and the second fθlenses 24 deflect the beam light 21, which has been deflected by the polygon mirror 22 at a constant angular velocity, such that the beam lights 21K, 21C, 21M, and 21Y for scanning the surfaces to be scanned of the photosensitive drums 15K, 15C, 15M, and 15Y scan at a constant velocity in the main scanning direction, and form images on the surfaces (the surfaces to be scanned) of the photosensitive drums 15K, 15C, 15M, and 15Y.

Figure 5:
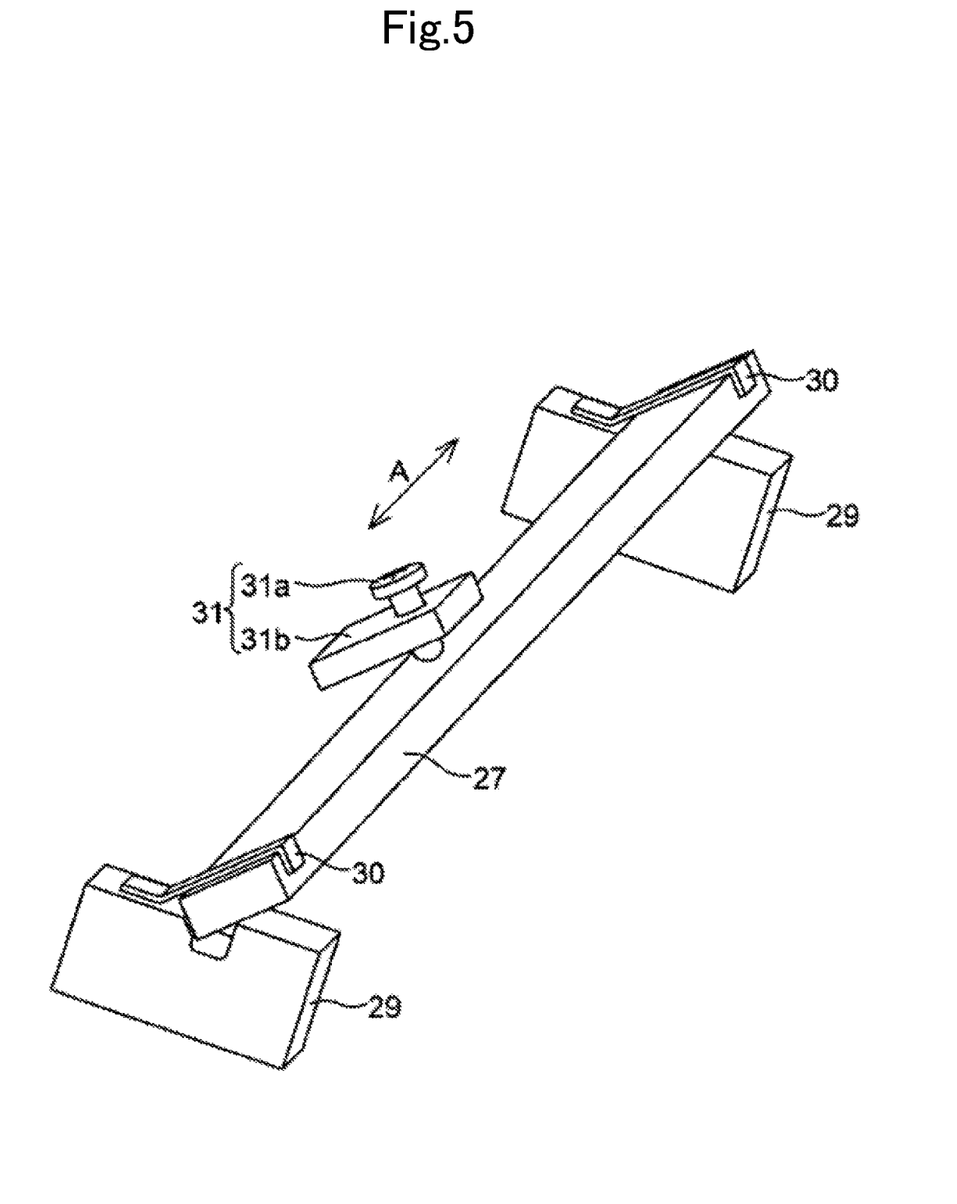
FIG. 5 is a perspective view illustrating a structure around a final planar mirror of an optical scanning device of an embodiment of the present invention.

The planar mirrors 25 and 26 and the final planar mirrors 27 are reflection members installed on optical paths of the beam lights 21K, 21C, 21M, and 21Y, and are arranged at predetermined positions in the optical scanning device 20 in such a manner that their both ends in a longitudinal direction are fixed by a holding base 29 and a fixing spring 30 (see FIG. 5). In addition, it is possible to appropriately change the number of planar mirrors (25 to 27) arranged on each optical path and an installation angle of the reflection surface.

An image forming operation by the image forming apparatus 1 configured as above will be described. When image forming start is inputted by a user, the photosensitive drums 15K, 15C, 15M, and 15Y are rotationally driven at the first time, the surfaces of the photosensitive drums 15K, 15C, 15M, and 15Y are uniformly charged by the charging device 16, and beam light is irradiated by the optical scanning device 20 on the basis of an inputted image signal, so that an electrostatic latent image corresponding to the image signal is formed on each of the photosensitive drums 15K, 15C, 15M, and 15Y.

Hereinafter, a beam optical scanning operation by the optical scanning device 20 will be described. The beam lights 21K, 21C, 21M, and 21Y is incident into the reflection surface of the polygon mirror 22 from the four light sources (not illustrated) included in the optical scanning device 20. At this time, in order to facilitate optical path separation of the four beam lights 21K, 21C, 21M, and 21Y deflected by the polygon mirror 22, these beam lights 21K, 21C, 21M, and 21Y are configured to be incident into the polygon mirror 22 at different angles in the main scanning direction or the sub-scanning direction.

The beam lights 21K, 21C, 21M, and 21Y incident into the polygon mirror 22 are deflected at a constant angular velocity by the polygon mirror 22, and then are deflected at a constant velocity by the first fθlenses 23, and the second fθlenses 24 while being returned a predetermined number of times by the planar mirrors 25 and 26 arranged on respective optical paths. Then, the beam light is returned by the final planar mirrors 27 finally provided on the optical paths, and is distributed to the surfaces of the photosensitive drums 15K, 15C, 15M, and 15Y.

Next, developers of each color of black, cyan, magenta, and yellow filled in the developing unit 17 from a replenishment device (not illustrated) are supplied to the photosensitive drums 15K, 15C, 15M, and 15Y, toner images corresponding to the electrostatic latent images are formed, an electric field is applied to the intermediate transfer belt 11 at a predetermined transfer voltage, and then the toner images of black, cyan, magenta, and yellow on the photosensitive drums 15K, 15C, 15M, and 15Y are transferred onto the intermediate transfer belt 11 by the intermediate transfer roller 19. These four colors of images are formed with a predetermined positional relation decided in advance in order to form a predetermined full color image. Then, developers used for subsequently forming new electrostatic latent images and remaining on the surfaces of the photosensitive drums 15K, 15C, 15M, and 15Y are removed by the cleaning unit 18.

Furthermore, when the intermediate transfer belt 11 starts to rotate clockwise with the rotation of the driving roller 12 by a driving motor (not illustrated), the paper P is conveyed to the transfer roller 8 provided adjacent to the intermediate transfer belt 11 from the resist roller pair 7 at a predetermined timing, and the full color image is transferred to the paper P. Then, the paper P with the transferred toner image is conveyed to the fixing roller 9 and is heated and pressed by the fixing roller 9, so that the toner image is fixed to the surface of the paper P and thus a predetermined full color image is formed. The paper P with the formed full color image is discharged to the discharge tray 4 by the paper discharge roller pair 10.

Figure 3:
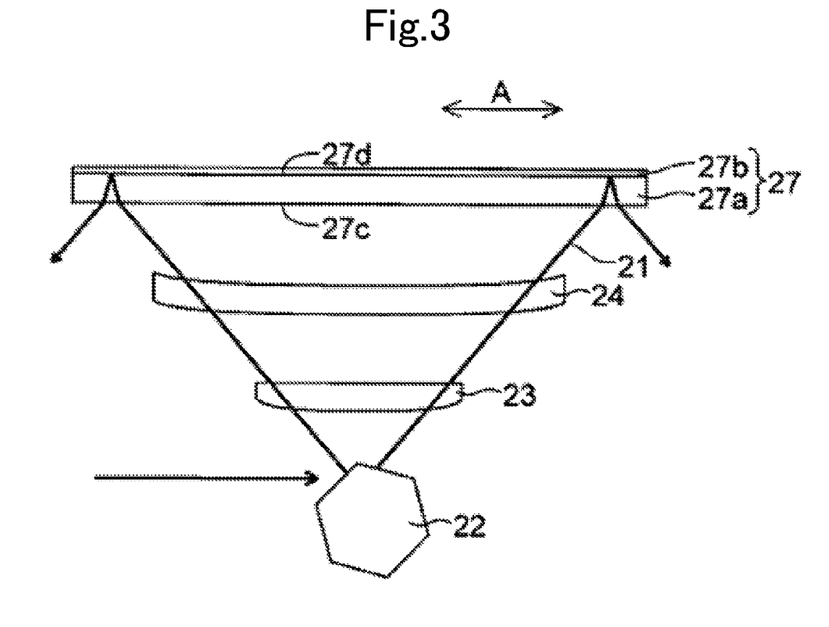
FIG. 3 is a diagram for explaining beam light reflected in a final planar mirror of an optical scanning device of an embodiment of the present invention.
Figure 4:
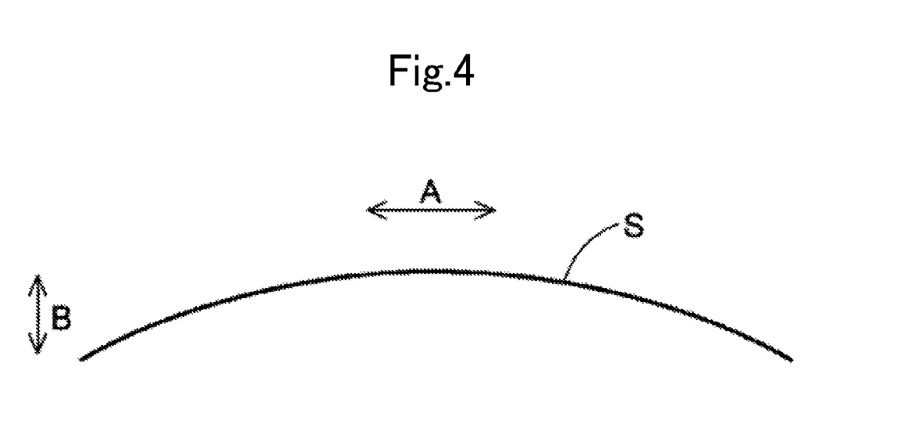
FIG. 4 is a diagram illustrating a state in which a scanning line has been curved in a convex shape to one side in a sub-scanning direction by a final planar mirror of an optical scanning device of an embodiment of the present invention.

Next, the final planar mirror 27 will be described in detail. In the present embodiment, as illustrated in FIG. 3, the final planar mirror 27 is configured by a glass plate 27a for allowing beam light to pass therethrough and a reflection layer 27b. The glass plate 27a has a light incident surface 27c, into which the beam light 21 is incident, and a reflection surface 27d arranged at an opposite side of the light incident surface 27c. In this way, the beam light 21 is incident from the light incident surface 27c, passes through the glass plate 27a, is reflected at the reflection surface 27d side, passes through the glass plate 27a again, and is emitted from the light incident surface 27c. At this time, since the incidence angles of the beam light 21 are different from each other at the center portion and both end portions in the longitudinal direction (the main scanning direction and the direction of an arrow A) of the final planar mirror 27, optical paths of the beam light 21 passing through the glass plate 27a are different from each other. Therefore, the beam light 21 reflected in the final planar mirror 27 is curved in the sub-scanning direction, and as illustrated in FIG. 4, on the surface to be scanned of the photosensitive drum 15, a scanning line S is curved in a convex shape to one side (herein, an upper side) in the sub-scanning direction (the direction of an arrow B).

The curved amount of the scanning line has been set to be larger than the curved amount of a scanning line occurring by a manufacturing error, a mounting error and the like of the fθlenses (23, 24) or the planar mirrors (25 to 27). Therefore, scanning line curvature applied in advance by the final planar mirror 27 is always formed in a convex shape on a surface to be scanned to one side (herein, an upper side) in the sub-scanning direction.

Furthermore, as illustrated in FIG. 5, the final planar mirror 27 is provided at a back surface side thereof with a pressing member 31 for pressing the back surface of the final planar mirror 27. The pressing member 31 is arranged so as to press a center portion in the longitudinal direction (the main scanning direction and the direction of an arrow A) of the back surface of the final planar mirror 27.

The pressing member 31 has a screw 31a for pressing the back surface of the final planar mirror 27 and a screw holding member 31b formed with a screw hole into which the screw 31a is screwed. The screw holding member 31b is fixed to a casing of the optical scanning device 20.

Figure 6:
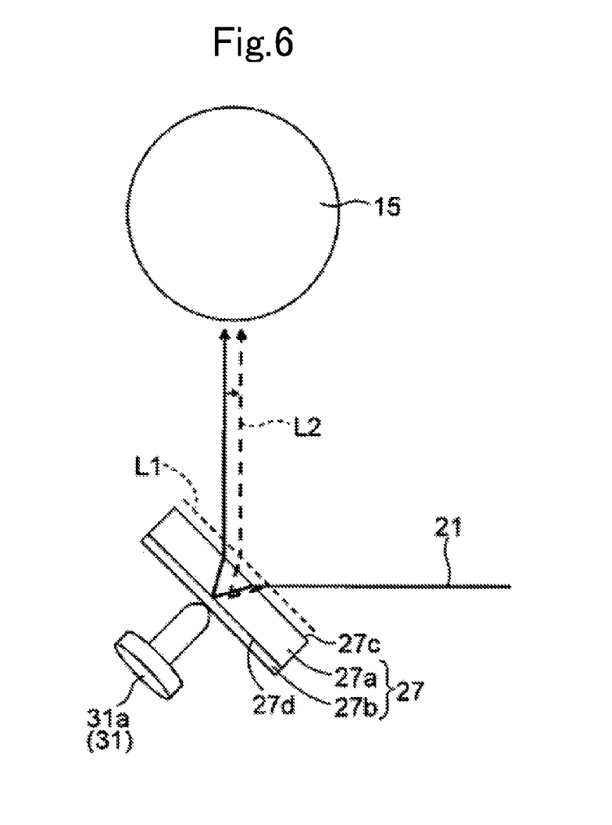
FIG. 6 is a diagram for explaining beam light reflected in a final planar mirror when a back surface of the final planar mirror of an optical scanning device of an embodiment of the present invention has been pressed by a pressing member.
Figure 7:
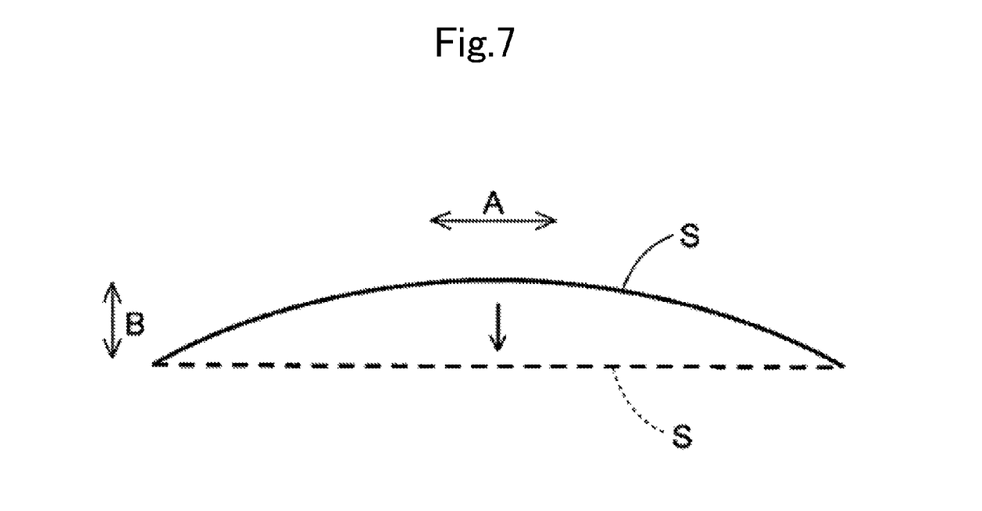
FIG. 7 is a diagram for explaining a state in which a scanning line curved in a convex shape has been adjusted in a flat shape by pressing a back surface of a final planar mirror of an optical scanning device of an embodiment of the present invention by a pressing member.

When the screw 31a is screwed into the screw hole of the screw holding member 31b, the front end of the screw 31a presses the back surface of the final planar mirror 27, so that the final planar mirror 27 is curved such that the light incident surface 27c has a convex shape. At this time, as illustrated in FIG. 6, the center portion of the final planar mirror 27 is bent as indicated by a broken line L1, and the beam light 21 reflected at the center portion of the final planar mirror 27 progresses as indicated by a broken line L2. In this way, as illustrated in FIG. 7, the scanning line S (a solid line) curved in advance in a convex shape to one side (herein, an upper side) in the sub-scanning direction (the direction of an arrow B) is adjusted to a flat shape as indicated by a broken line.

In addition, a rotation amount of the screw 31a is adjusted, so that it is possible to change the degree of curvature of the final planar mirror 27 and to easily planarize the scanning line S.

In the present embodiment, as described above, the beam light 21 passes through the glass plate 27a of the final planar mirror 27 and is reflected at the reflection surface 27d side, so that the scanning line S is curved in a convex shape on a surface to be scanned to one side in the sub-scanning direction in the state in which the final planar mirror 27 has not been curved by the pressing member 31, and the back surface of the final planar mirror 27 is pressed by the pressing member 31 and the final planar mirror 27 is curved, so that it is possible to adjust the scanning line S on the surface to be scanned to a flat shape. That is, the final planar mirror 27 is formed such that the scanning line S is curved in a convex shape to one side in the sub-scanning direction and the final planar mirror 27 is curved by the pressing member 31, so that the scanning line S has a flat shape. Therefore, since it is sufficient if the final planar mirror 27 can be curved to only one side in a thickness direction, it is possible to suppress scanning line curvature by using the pressing member 31 having a configuration of simply pressing the back surface of the final planar mirror 27.

Furthermore, the beam light 21 passes through the glass plate 27a and is reflected at the reflection surface 27d side. In this case, since the incidence angles of the beam light 21 are different from each other by the positions (the center portion, the end portions and the like) of the glass plate 27a and thus the optical path lengths of the beam light 21 passing through the glass plate 27a are different from each other, scanning line curvature can easily occur.

Furthermore, the thickness of the glass plate 27a is changed, so that it is possible to easily adjust the curved amount of a scanning line which is applied in advance to one side in the sub-scanning direction.

Furthermore, as described above, the pressing member 31 presses the center portion in the main scanning direction of the back surface of the final planar mirror 27. In this way, the final planar mirror 27 can be symmetrically curved in the main scanning direction, so that it is possible to easily adjust the scanning line S to a flat shape.

Furthermore, as described above, the planar mirrors (the final planar mirror 27 and the second planar mirror) pressed by the pressing member 31 are the same as the planar mirrors (the final planar mirror 27 and the first planar mirror) that reflect the beam light 21 at the opposite surface 27d side of the glass plate 27a and curve the scanning line S in a convex shape to one side in the sub-scanning direction. In this way, it is possible to suppress scanning line curvature by one final planar mirror 27 in each optical path, so that it is possible to simplify the configuration of the optical scanning device 20.

Furthermore, as described above, the pressing member 31 is configured by the screw 31a and the screw holding member 31b formed with a screw hole into which the screw 31a is screwed. In this way, it is possible to easily achieve the pressing member 31 with a simple configuration.

In addition, it should be noted that the embodiment disclosed herein is illustrative in all respects and is not restrictive. The scope of the present invention is defined by the scope of the appended claims rather than the description of the aforementioned embodiment, and is intended to include all modifications within the meaning and scope equivalent to the scope of the appended claims.

For example, the example, in which the present invention has been applied to the color printer as illustrated in FIG. 1, has been illustrated; however, the present invention is not limited thereto. It goes without saying that the present invention can be applied to various image forming apparatuses including an optical scanning device for forming a latent image on a surface to be scanned by exposure scanning, such as a monochrome printer, a color copy machine, a monochrome copy machine, a digital multifunctional peripheral, and a facsimile.

Furthermore, in the aforementioned embodiment, the example, in which two or three planar mirrors have been arranged on each optical path, has been illustrated; however, one or four or more planar mirrors may also be arranged on each optical path.

Furthermore, in the aforementioned embodiment, the example, in which the planar mirror (the first planar mirror), which reflects the beam light 21 at the reflection surface 27d side of the glass plate 27a and curves the scanning line S in a convex shape to one side in the sub-scanning direction, and the planar mirror (the second planar mirror), which is pressed by the pressing member 31 to allow the scanning line S to have a flat shape, has been configured by the final planar mirror 27, has been illustrated; however, the planar mirror (the first planar mirror) and the planar mirror (the second planar mirror) may also be configured by the planar mirror 25 or 26.

Furthermore, in the aforementioned embodiment, the example, in which the planar mirror, which curves the scanning line S in a convex shape to one side in the sub-scanning direction, and the planar mirror, which allows the scanning line S to have a flat shape, has been configured by the same planar mirror, has been illustrated; however, is not limited thereto. The planar mirror (the first planar mirror), which curves the scanning line S in a convex shape to one side in the sub-scanning direction, and the planar mirror (the second planar mirror), which allows the scanning line S to have a flat shape, may also be configured by different planar mirrors. For example, the scanning line S may also be curved in a convex shape to one side in the sub-scanning direction by the planar mirror 25 or 26 and may also be allowed to have a flat shape by the final planar mirror 27. Furthermore, the planar mirror (the second planar mirror) for allowing the scanning line S to have a flat shape may also be arranged at an upper stream side of an optical path from the planar mirror (the first planar mirror) for curving the scanning line S in a convex shape to one side in the sub-scanning direction.

The invention claimed is:

1. An optical scanning device comprising:
a rotating polygon mirror that deflects and scans beam light from a light source in a main scanning direction;
a lens that forms an image of the beam light deflected by the rotating polygon mirror on a surface to be scanned;
one or more planar mirrors provided on an optical path between the rotating polygon mirror and the surface to be scanned and reflecting the beam light so as to be led to the surface to be scanned; and
a pressing member that presses a back surface of the planar mirror,
wherein the planar mirror comprises:
a first planar mirror including a glass plate, which has a light incident surface into which the beam light is incident and an opposite surface arranged at an opposite side of the light incident surface and allows the beam light to pass therethrough, and a reflection layer arranged on the opposite surface of the glass plate; and
a second planar mirror having the back surface pressed by the pressing member,
wherein the beam light passes through the glass plate of the first planar mirror and is reflected at the opposite surface side, so that a scanning line is curved on the surface to be scanned in a convex shape to one side in a sub-scanning direction, and
the back surface of the second planar mirror is pressed by the pressing member and the second planar mirror is curved, so that the scanning line on the surface to be scanned, which has been curved by the first planar mirror, is adjustable to a flat shape.

2. The optical scanning device according to claim 1, wherein the pressing member presses a center portion in the main scanning direction of the back surface of the second planar mirror.

3. The optical scanning device according to claim 1, wherein the second planar mirror is equal to the first planar mirror.

4. The optical scanning device according to claim 1, wherein the planar mirror is provided in a plural number on the optical path between the rotating polygon mirror and the surface to be scanned, and the second planar mirror is different from the first planar mirror.

5. The optical scanning device according to claim 1, wherein the pressing member has a screw that presses the back surface of the second planar mirror and a screw holding member formed with a screw hole into which the screw is screwed.

6. An image forming apparatus including the optical scanning device according to claim 1.

* * * * *